(No Model.)   2 Sheets—Sheet 1.

W. C. PETERS.
CULTIVATOR.

No. 334,045. Patented Jan. 12, 1886.

WITNESSES:
Gunvald Aas
John G. Honey

INVENTOR
William C. Peters.
BY James A. Whitney
ATTORNEY (No Model.) 2 Sheets—Sheet 2.

W. C. PETERS.
CULTIVATOR.

No. 334,045. Patented Jan. 12, 1886.

WITNESSES:
Gunwald Aas.
John G. Honey

INVENTOR
William C. Peters.
BY James A. Whitney
ATTORNEY

UNITED STATES PATENT OFFICE.

WILLIAM C. PETERS, OF HICKSVILLE, NEW YORK.

CULTIVATOR.

SPECIFICATION forming part of Letters Patent No. 334,045, dated January 12, 1886.

Application filed July 3, 1885. Serial No. 170,657. (No model.)

*To all whom it may concern:*

Be it known that I, WILLIAM C. PETERS, of Hicksville, in the county of Queens and State of New York, have invented certain Improvements in Cultivators, of which the following is a specification.

This invention relates to that class of agricultural implements used in tilling growing crops in rows or drills; and its object is to provide an implement of the class mentioned which shall be capable of varied adjustment to meet requirements of rows or drills at various distances apart, and the effective width of which may be temporarily changed at will, as special circumstances may require. To this end my said invention comprises certain novel combinations of parts whereby said objects are effectually secured.

Figure 1:
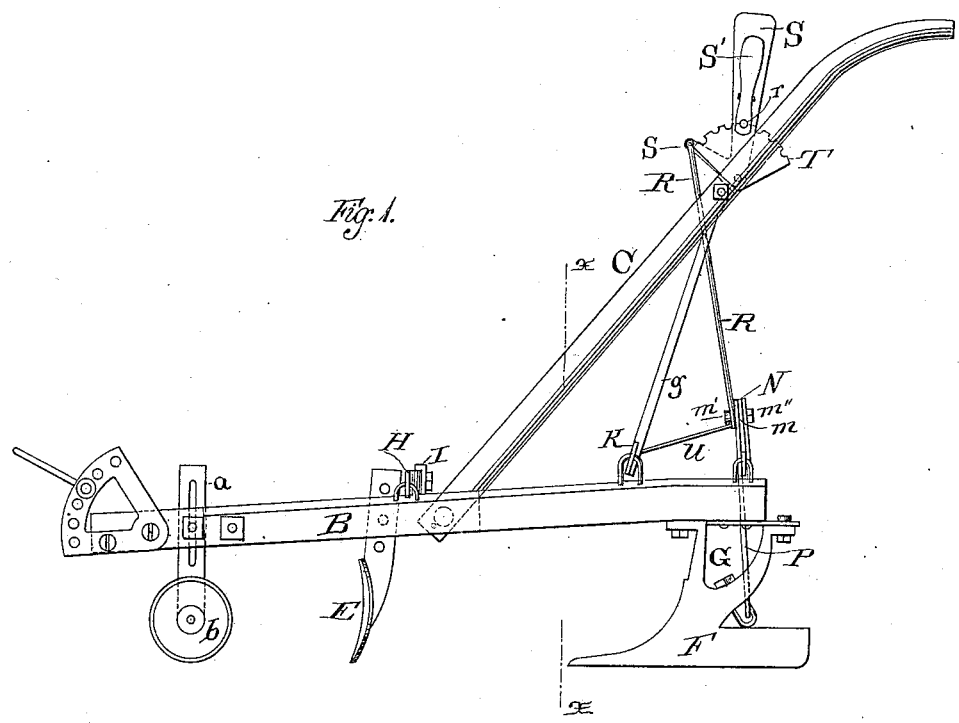
Figure 2:
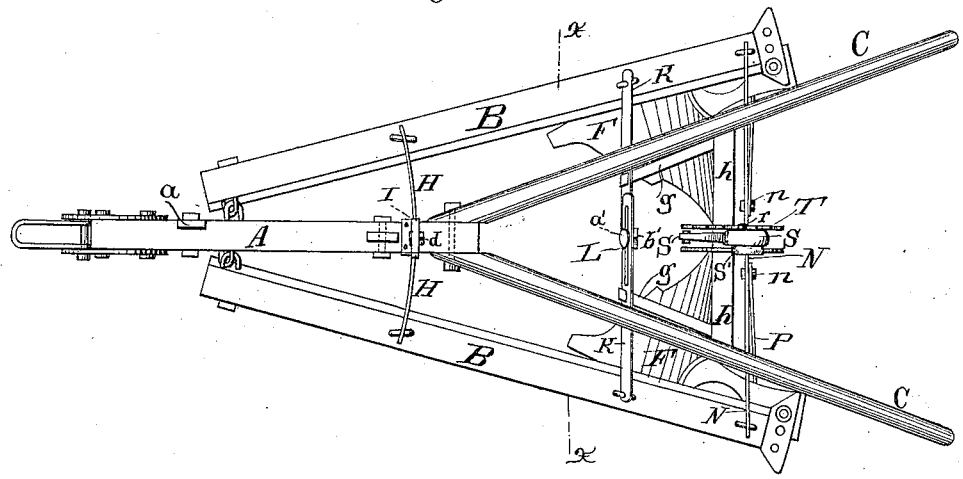
Figure 3:
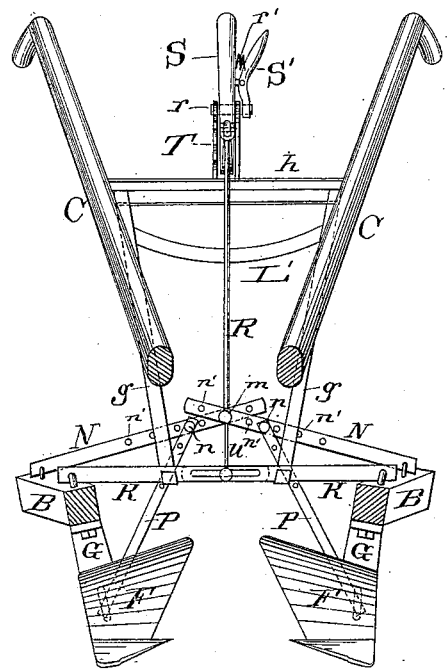
Figure 4:
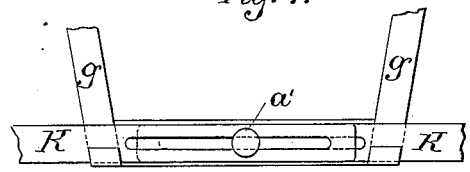
Figure 5:
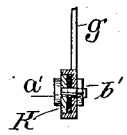
Figure 6:
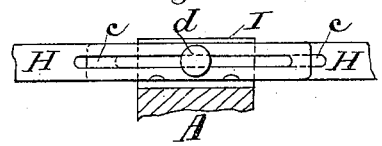

Figure 1 is a side view, Fig. 2 a plan view, and Fig. 3 a vertical transverse sectional view, taken in the line $x\ x$ of Figs. 1 and 2, of an implement made according to my said invention. Figs. 4, 5, and 6 are detached detail views of certain parts of said implement.

A is the center beam of the cultivator-frame, and may be provided at its forward end with the usual or any suitable clevis, $a$, and wheel $b$. B B are the side beams, pivotally connected at their forward extremities to the forward part of the center beam, A, in any usual or suitable manner. The ordinary handles, C C, are attached to the center beam preferably at the rear thereof, said center beam being made shorter than the side beams.

Any desired arrangement of shares may be employed in connection with the frame composed of the center and side beams, as aforesaid; but preferably, and as shown in the drawings, a double share, E, in the center beam and plow-shaped shares and mold-boards F at the rear of each side beam, said shares and mold-boards being attached to standards G, secured to the side beams, and the parts being so arranged that, when desired, the shares and mold-boards may be changed and adjusted at will upon the standards, to throw the furrow inward or outward, according to the requirements of any given crop or system of tillage.

Attached to each side beam B is a flat bar or metal strip, H, which extends horizontally inward over the center beam, but which is placed vertically on edge, and which has a long slot, $c$, in its inner portion. The slotted inner parts of these bars H pass one behind the other, and both pass across the adjacent face of a bracket, I, secured to the center beam, and provided with a tightening-bolt or set-screw, $d$. By loosening this bolt or set-screw the bars H are released so that the side beams may be adjusted to any distance from the center beam, whereupon, by retightening said bolt or set-screw, the bars are rigidly retained in position to assist in holding the side beams in due relation with the center beam.

Attached to the rear portions of the side beams are inwardly-extended bars K, the inner ends of which lap past each other, and are slotted at their coincident or overlapping parts, so that a screw-bolt, L, with a broad head, $a'$, at one end and a nut, $b'$, at the other may be passed through the coincident slots, to tighten the bars K together between the head $a'$ and nut $b'$, to retain the side beams at any desired distance apart, the available or working width of the implement being by this means adjustable. To support the bars K, there are two hangers, $g$, the lower ends of which are loosely hooked under said bars. Said hangers preferably form part of a frame, L', attached to the handles o the implement, and the cross-piece $h$ of which forms a support for the lever S, herein presently described.

Attached by pivots, staples, or other free connection to the side beams are bars N, the inner ends of which overlap in the same manner as the bars K, and which are connected by a screw-bolt, $m$, having a broad head, $m'$, at one end and a nut, $m''$, at the other. The said bars N have holes $n'$ along their length, so that by bringing a hole in one of the bars coincident with a hole in the other bar the bolt $m$ may be passed through them to pivotally connect the two bars. To support the bars N, braces P are pivoted at their lower ends to the standards of the rear shares and mold-board, and extend obliquely upward and lap past the adjacent bar N. Each brace P has holes along its upper portion, so that one of these holes being brought coincident with one of those in the adjacent bar N, the two may be connected by a broad-headed screw and nut, n, in substantially the same manner that the two inner portions of said bars N are connected, as hereinbefore explained. To the bolt or pivot m is connected the lower end of a rod, R, the upper end of which is attached to the lower arm of an elbow-lever, S, pivoted to the cross-piece h, which latter has rigid thereon and parallel with the plane of movement of said elbow-lever a ratchet, T. A pawl, r, slides through a transverse bearing in the lever S, and is attached to the lower end of a pawl-actuating lever, S', which is pivoted to the side of the said lever S, and has, preferably, its outer arm pressed outward by a suitable spring, r'. By moving inward the upper arm of the lever S' the pawl is withdrawn from the ratchet, and vice versa.

By drawing backward the upper arm of the elbow-lever the bars N are lifted at their inner ends, and thereby draw the rear ends of the side beams nearer together to any desired extent, thereby narrowing the actual width of the implement to meet the exigencies of any given case. When the bars N are lifted, as described, the bars H slide one upon another to the requisite extent. When the upper arm of the elbow-lever is brought backward, as described, it may be retained in place by permitting the pawl to engage with the ratchet. By releasing the pawl from the ratchet and causing said arm of said lever to move forward the side beams are moved outward to the limit permitted by the bars K. The bars N and K are capable of adjustment to work in unison, as described. A horizontal brace, U, is extended from one of the bars K to the bar N behind it, in order that the bars K and N may mutually strengthen or stiffen each other.

What I claim as my invention is—

1. The combination, with the center beam, A, and adjustable side beams, B, and handles C, of the slotted bars K, bolt L, bars N, having holes n' and centrally connected by a suitable bolt, rod R, a lifting-lever, S, and a suitable pawl and ratchet for retaining said lever in position when the rod is lifted, all substantially as and for the purpose herein set forth.

2. The combination, with the center beam, A, and adjustable side beams, B, and handles C, of the slotted bars K, bolt L, bars N, having holes n' and centrally connected by a suitable bolt, rod R, a lifting-lever, S, a suitable pawl and ratchet for retaining said lever in position when the rod is lifted, slotted bars H, and fastening bolt or device d, all substantially as and for the purpose herein set forth.

3. The combination, with the center beam, A, and adjustable side beams, B, and handles C, of the slotted bars K, bolt L, bars N, having holes n' and centrally connected by a suitable bolt, rod R, a lifting-lever, S, a ratchet, T, fixed in relation to the handles, a pawl, r, arranged to slide transversely through the lever, and a secondary lever, S', pivoted to the lever S, to actuate the said pawl, all substantially as and for the purpose herein set forth.

4. The combination, with the center beam, A, and adjustable side beams, B, and handles C, of the slotted bars K, bolt L, bar N, having holes n' and centrally connected by a suitable bolt, rod R, a lifting-lever, S, a ratchet, T, fixed in relation to the handles, a pawl, r, arranged to slide transversely through the lever, and a secondary lever, S', pivoted to the lever S, to actuate the said pawl, slotted bars H, and fastening bolt or device d, all substantially as and for the purpose herein set forth.

WILLIAM C. PETERS.

Witnesses:
PHILIP LAVELLE,
AUGUST F. PETERS.